United States Patent Office 3,519,676
Patented July 7, 1970

3,519,676
PRODUCTION OF DIESTERS OF ORGANIC
DICARBOXYLIC ACIDS
Jacques Marius Duroux and Pierre Louis Faye, Lyon, France, assignors to Rhone-Poulenc S.A., Paris, France, a French body corporate
No Drawing. Filed Dec. 21, 1966, Ser. No. 603,438
Claims priority, application France, Jan. 4, 1966, 44,787
Int. Cl. C07c 69/80, 69/82
U.S. Cl. 260—475          8 Claims

ABSTRACT OF THE DISCLOSURE

Diesters of organic carboxylic acids and monohydric alkanols of 1 to 4 carbon atoms, especially dimethyl terephthalate, are prepared by heating the acid and the alkanol with an organic disulphonic acid catalyst such as m-benzenedisulphonic acid, and continuously removing alkanol, diester and water formed. The diesters are useful in the production of polyesters e.g. polyethylene-terephthalate.

The invention relates to the production of diesters of organic (especially aromatic) dicarboxylic acids and monohydric alcohols by reaction of the acid and the alcohol, and in particular to the production of dimethyl terephthalate.

Diesters of dicarboxylic organic acids have found numerous industrial uses. For example, it is well known that the diesters of phthalic, isophthalic or terephthalic acid with lower monohydric alcohols may be employed in the preparation of polyesters. The lower monoalcohol ester is transesterified with a diol such as ethyleneglycol and the resulting ester is then polycondensed. For example, dimethyl terephthalate is used in the production of ethyleneglycol polyterephthalate.

Many processes have been used for the preparation of diesters by direct reaction of benzenedicarboxylic acids with monoalcohols, particularly methanol and ethanol. In general, a mixture of acid and alcohol is heated at high temperature and under pressure, in the presence or absence of a catalyst. In addition, in order to displace the equilibrium and to promote the transformation of the acid into ester, the diester has generally been removed from the reaction mixture together with water vapour and alcohol vapour, an excess of alcohol being employed relative to the dicarboxylic acid. These processes have their disadvantages. In the absence of catalyst, it is necessary to operate at excessively high temperatures in order to obtain commercially suitable esterification reaction rates, and many by-products are then formed. With catalysts such as sulphuric acid and the monosulphonic acids, it has been possible to operate at lower temperatures and to avoid the formation of by-products, while obtaining appropriate esterification reaction rates. However, it has been found that, by reason either of the low thermal stability or of the volatility of the catalyst or of the ester which is formed between the catalyst and the alcohol, the continual introduction of fresh catalyst is necessary to maintain an appropriate rate of esterification of the dicarboxylic acid. Moreover, the diester formed is contaminated, for example by sulphuric esters formed between the catalyst and the alcohol which necessitates a purification. The purification is often very difficult and may give rise to complicated problems.

United States specification No. 2,776,985 describes a method of obviating the disadvantages of the use of sulphuric acid or monosulphonic acid catalysts. The specification describes the use of aromatic phosphonic acids as catalysts. The aromatic residue of these acids may comprise a functional group such as a sulphonic, phosphonyl ($-PO_3H_2$), carboxyl or hydroxyl group. However, these acids are relatively poor esterification catalysts and thus the speed of the reaction is low, and the duration of the contact of the reactants is very long. It is necessary to employ considerable quantities of these aromatic phosphonic acids, which are more difficult to prepare than the sulphonic acids usually employed, and to use high temperatures, of the order of 240° to 260° C., which favour the formation of by-products.

The present invention provides a process for the production of the diesters of dicarboxylic acids and monohydric alcohols, more particularly diesters of dicarboxylic aromatic acids and lower alkanols such as methanol and ethanol, by reaction of the alcohol with the dicarboxylic acid in which the disadvantages mentioned above are mitigated or overcome.

According to the invention there is provided a process for the production of diesters of organic dicarboxylic acids and monohydric alkanols of 1 to 4 carbon atoms which comprises heating in a reaction zone an organic dicarboxylic acid with a monohydric alkanol of 1 to 4 carbon atoms in the presence of, as catalyst, an organic disulphonic acid, and continuously removing from the reaction zone a mixture of alkanol, diester and water.

The esterification proceeds rapidly at relatively low temperatures and pressures, and in addition the amount of catalyst present in the reaction medium remains substantially constant and the production of a clean diester is enormously simplified.

Examples of suitable disulphonic acids which may be employed in the process of the invention are aliphatic disulphonic acids, such as 1,2 - ethanedisulphonic acid and 1,3 - propanedisulphonic acid, and aromatic disulphonic acids such as m - benzenedisulphonic acid, 2,5-, 2,6- or 2,7-naphthalenedisulphonic acids or mixtures of these isomers, 2,4- and 2,5-toluenedisulphonic acid or mixtures thereof, or 3,5-o-xylenedisulphonic acid.

The esterification temperature in the presence of disulphonic acids will ordinarily be between 150° and 230° C., preferably between 170° and 210° C., and the pressure from 1 to 10 bars (1 to 10.2 kg./cm.² absolute, preferably 1 to 4 kg./cm.²), depending upon the reactants employed, though if less pure diester should be desired, the reaction rate can be increased by increasing the temperature to 250° C. or higher. When the acid is terephthalic acid and the alcohol is methanol or ethanol a suitable temperature is from 180° C. to 200° C.

The quality of catalyst employed may vary in accordance with the acids and alcohols to be reacted. Preferably, quantities of the order of 1% to 15% by weight of disulphonic acid calculated on the total weight of reaction medium are employed. Larger quantities can be used, although heed must be paid to possible contamination of the diester and to the economic requirements.

The process of the invention is primarily applicable to the esterification of aromatic dicarboxylic acids, especially benzenedicarboxylic acids. The monohydric alkanols employed are preferably methanol or ethanol, although other alkanols having from 1 to 4 carbon atoms may be used.

The monohydric alcohol is normally present in a large excess over the organic dicarboxylic acid: the molar ratio of alcohol:dicarboxylic acid may be, for example, from 5:1 to 20:1.

The esterification reaction in the presence of disulphonic acids may be carried out in accordance with the usual techniques. For example, alcohol may be run into a charge of acid, or of acid and the diester, containing the catalyst, and be heated to the required temperature. The diester, alcohol and water are best removed in the vapour phase e.g. by reducing the pressure to allow them to distil into a receiving vessel. It is desirable to add some preformed diester to the initial reaction charge to increase the reaction rate, for example about 3 moles of diester per mole of dicarboxylic acid. Continuous operation of the process is possible, since the alcohol and the acid may be charged into the reactor as the carboxylic diester formed is removed from the reactor.

The following examples illustrate the invention and show how it can be put into practice.

EXAMPLE 1

20 kg. of dimethyl terephthalate and 0.220 kg. of m-benzenedisulphonic acid (1.1% by weight) are introduced into a 25 litre stainless-steel reactor equipped to operate under pressure and provided with a stirring device, a heating jacket, pipes for the introduction of the reactants and a pipe provided with an expansion valve for the discharge of the reaction products. The reactants are heated to 200° C. A suspension of terephthalic acid in methanol is continuously introduced under pressure at rates of 3.2 kg. per hour of terephthalic acid and 12.8 kg. per hour of methanol. The pressure in the reactor is maintained at an absolute value of 2 bars (2 kg./cm.$^2$) by adjustment of the expansion valve.

The dimethyl terephthalate formed is entrained in the vapour phase by unreacted methanol removed from the reaction vessel and separated by condensation of the vapours and crystallisation. After 2 hours, a stable rate of operation is reached: the amount of acid irganic substances in the reactor is then 2% by weight and the rate of production of dimethyl terephthalate is 3.7 kg. per hour, which corresponds to a yield of 99% calculated on the terephthalic acid employed.

The loss of m-benzenedisulphonic acid, determined by titration of the reaction medium, is only 0.5 g. per kg. of terephthalic acid introduced. The amount of dimethyl ether formed as byproduct does not exceed 120 g. per kg. of dimethyl terephthalate formed.

EXAMPLE 2

500 g. of dimethyl terephthalate, 150 g. of terephthalic acid, and 20 g. of m-benzenedisulphonic acid were introduced into a 1.5 litre glass reactor provided with a turbine stirrer, a heating jacket, a dipping tube for the introduction of methanol and a tube for the discharge of methanol vapour and reaction products. The contents of the reactor are brought to 180° C., and 200 g. per hour of methanol are introduced, and fresh terephthalic acid is periodically added to maintain the quantity of terephthalic acid in the reaction medium at substantially its initial value. The reaction is followed by determining the quantity of terephthalic acid consumed as a function of time. The following results are obtained:

| Time (hours): | Quantity of terephthalic acid consumed in g./hour |
|---|---|
| 2 | 45 |
| 4 | 40 |
| 6 | 40 |
| 8 | 35 |
| 10 | 35 |
| 12 | 33 |
| 14 | 30 |
| 16 | 30 |
| 18 | 30 |
| 20 | 30 |
| 22 | 30 |
| 24 | 30 |

This procedure was repeated except that 80 g. of naphthalenedisulphonic acid and a temperature of 195° C. were used. The following results were obtained:

| Time (hours): | Quantity of terephthalic acid consumed in g./hour |
|---|---|
| 2 | 35 |
| 4 | 35 |
| 6 | 30 |
| 8 | 30 |
| 10 | 30 |
| 12 | 30 |
| 14 | 25 |
| 16 | 25 |
| 18 | 25 |
| 20 | 25 |
| 22 | 25 |
| 24 | 25 |

The above procedure was repeated, except that 40 g. of p-hydroxycarbonylphenylphosphonic acid, and a temperature of 180° C. were used. No dimethyl terephthalate was formed after 2 hours.

We claim:
1. A process for the production of diesters of benzene dicarboxylic acids and monohydric alkanols of 1 to 4 carbon atoms which comprises heating to 150° to 230° C. in a reaction zone a benzene dicarboxylic acid with a monohydric alkanol of 1 to 4 carbon atoms in the presence of, as catalyst, an aromatic disulphonic acid selected from m-benzene disulphonic acid and naphthalene-2,5-disulphonic acid, and continuously removing from the reaction zone a mixture of alkanol, diester and water.

2. Process according to claim 1, wherein the aromatic disulphonic acid constitutes 1% to 15% by weight of the total reaction medium.

3. Process according to claim 1, wherein the reactants are heated to 170° to 210° C.

4. Process according to claim 1, wherein the reactants are heated under a pressure of from 1 to 4 kg./cm.$^2$ absolute.

5. Process according to claim 1, wherein the initial molar ratio of monohydric alkanol to dicarboxylic acid is from 5:1 to 20:1.

6. Process according to claim 1, wherein the benzene dicarboxylic acid is terephthalic acid.

7. Process according to claim 1, wherein the monohydric alkanol is methanol or ethanol.

8. Process according to claim 6, wherein dimethyl terephthalate and m-benzenedisulphonic acid are heated in a reaction vessel to 200° C. under superatmospheric pressure, a suspension of terephthalic acid in methanol is continuously introduced into the reaction vessel, and dimethylterephthalate, water and methanol are continuously removed from the reaction vessel through an expansion valve.

References Cited

UNITED STATES PATENTS

| 2,628,249 | 2/1953 | Bruno | 260—475 |
| 3,053,884 | 9/1962 | Touey et al. | 260—475 |

FOREIGN PATENTS 1,212,063  4/1964  Germany.

OTHER REFERENCES

Groggins: Unit Processes in Organic Synthesis, 4th ed., McGraw-Hill, New York (1952), pp. 607 and 608.

JAMES A. PATTEN, Primary Examiner

E. J. SKELLY, Assistant Examiner